United States Patent
Cho et al.

(10) Patent No.: US 9,256,508 B2
(45) Date of Patent: Feb. 9, 2016

(54) METHOD AND APPARATUS FOR CONTROLLING POWER IN LOW-POWER MULTI-CORE SYSTEM

(75) Inventors: Il-Hyun Cho, Seoul (KR); Sung-Joon Jang, Wonju-si (KR); Hyun-Moo Kim, Seongnam-si (KR); Nam-Su Ha, Anyang-si (KR); Jin-Hyo Kim, Hwaseong-si (KR); Tae-Il Kim, Seoul (KR); Ji-Hwan Park, Seoul (KR); Hye-Sun Kim, Suwon-si (KR); Jin-Kyoung Du, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 538 days.

(21) Appl. No.: 13/508,149

(22) PCT Filed: Nov. 4, 2010

(86) PCT No.: PCT/KR2010/007775
§ 371 (c)(1),
(2), (4) Date: May 4, 2012

(87) PCT Pub. No.: WO2011/056007
PCT Pub. Date: May 12, 2011

(65) Prior Publication Data
US 2012/0216054 A1      Aug. 23, 2012

(30) Foreign Application Priority Data
Nov. 5, 2009   (KR) .................. 10-2009-0106418

(51) Int. Cl.
*G06F 1/00*   (2006.01)
*G06F 1/26*   (2006.01)
*G06F 11/34*  (2006.01)
*G06F 1/32*   (2006.01)
*G06F 9/50*   (2006.01)

(52) U.S. Cl.
CPC .............. *G06F 11/34* (2013.01); *G06F 1/3287* (2013.01); *G06F 9/5094* (2013.01); *Y02B 60/1282* (2013.01); *Y02B 60/142* (2013.01); *Y02B 60/165* (2013.01); *Y02B 60/167* (2013.01) *G06F 9/5061* (2013.01);

(58) Field of Classification Search
CPC ................................... G06F 1/26; G06F 11/34
USPC ....................................................... 713/300
See application file for complete search history.

(56) References Cited

U.S. PATENT DOCUMENTS 8,281,160 B1 * 10/2012 Bai et al. .................. 713/300
2002/0188877 A1  12/2002 Buch
(Continued)

FOREIGN PATENT DOCUMENTS

KR   10-2010-0039140 A   4/2012

OTHER PUBLICATIONS

Tianzhou, C. et al, Dynamic power management framework for multi-core portable embedded system in: Proceedings of the 1st international forum on Next-generationg multicore/manycore technologies, ACM New York, 2008.

*Primary Examiner* — Thomas Lee
*Assistant Examiner* — Robert Cassity
(74) *Attorney, Agent, or Firm* — Jefferson IP Law, LLP (57) ABSTRACT

A method and apparatus for controlling power in a low-power multi-core system, including receiving task information from an Operation System (OS) kernel upon start and end of a task, estimating a future CPU usage using a current CPU usage in the task information, monitoring memory-related information in the task information, comparing a change in the current CPU usage with the monitored memory-related information, establishing a policy for power control based on the estimated CPU usage and the monitored memory-related information, and controlling on/off of multiple cores according to the established policy. By doing so, it is possible to solve the problems caused by performing DPM using only the CPU usage.

6 Claims, 7 Drawing Sheets

(56) References Cited

U.S. PATENT DOCUMENTS

| | | |
|---|---|---|
| 2006/0123264 A1* | 6/2006 | Bailey et al. ............... 713/323 |
| 2008/0235364 A1* | 9/2008 | Gorbatov et al. ............ 709/224 |
| 2009/0106571 A1 | 4/2009 | Low et al. |
| 2009/0249094 A1* | 10/2009 | Marshall et al. ............. 713/320 |
| 2010/0037188 A1* | 2/2010 | Jamann et al. ................ 716/2 |
| 2011/0093724 A1* | 4/2011 | Park et al. .................... 713/300 |
| 2011/0173617 A1* | 7/2011 | Gargash et al. .............. 718/100 |

* cited by examiner

METHOD AND APPARATUS FOR CONTROLLING POWER IN LOW-POWER MULTI-CORE SYSTEM

TECHNICAL FIELD

The present invention relates generally to an apparatus and method for preventing degradation in performance of a system, and more particularly, to an apparatus and method for preventing performance degradation in a low-power multi-core system.

BACKGROUND ART

In line with the need for low-power design to reduce power consumption while satisfying performance of various applications, there is growing importance of multi-core processors. The world's leading processor manufacturers, such as Intel and AMD (Advanced Micro Devices), have introduced high-performance, low-power multi-core chips, their associated solutions, and products based thereon. In particular, NVIDIA, TI (Texas Instruments), Qualcomm, etc. have released multi-core products for high-performance mobile terminals, presenting road maps for sustainable development thereof.

Meanwhile, there are known low-power techniques for single-core processors. However, in the multi-core environment, there are limits to minimizing power of multi-core systems with the low-power techniques used in the single-core environment. Accordingly, there is a need to modify and compensate the existing low-power techniques used in the single-core environment to be suitable for the multi-core environment.

Multi-core low-power control reduces power consumption by means of estimating a future Central Processing Unit (CPU) usage of a task by analyzing a CPU usage of the task being executed, and adjusting operation or performance of the cores by applying predetermined low-power policies.

This multi-core low-power technique may be roughly classified into Dynamic Power Shutdown (DPS) and Dynamic Voltage Frequency Scaling (DVFS). DPS is a technique of dynamically turning on/off power of cores according to the statuses of cores and the situations of applications, while DVFS is a technique of dynamically adjusting voltages and frequencies of cores according to the core statuses and the application situations. In addition, a technique of adjusting power in combination of these two techniques is called Dynamic Power Management (DPM).

Figure 1:
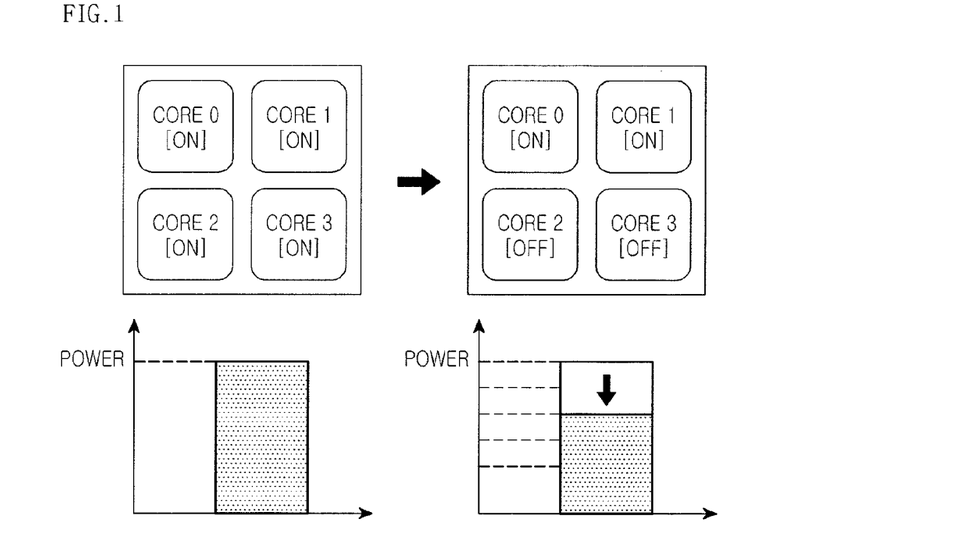
FIG. 1 is a diagram illustrating a general DPS-based power management method.
Figure 2:
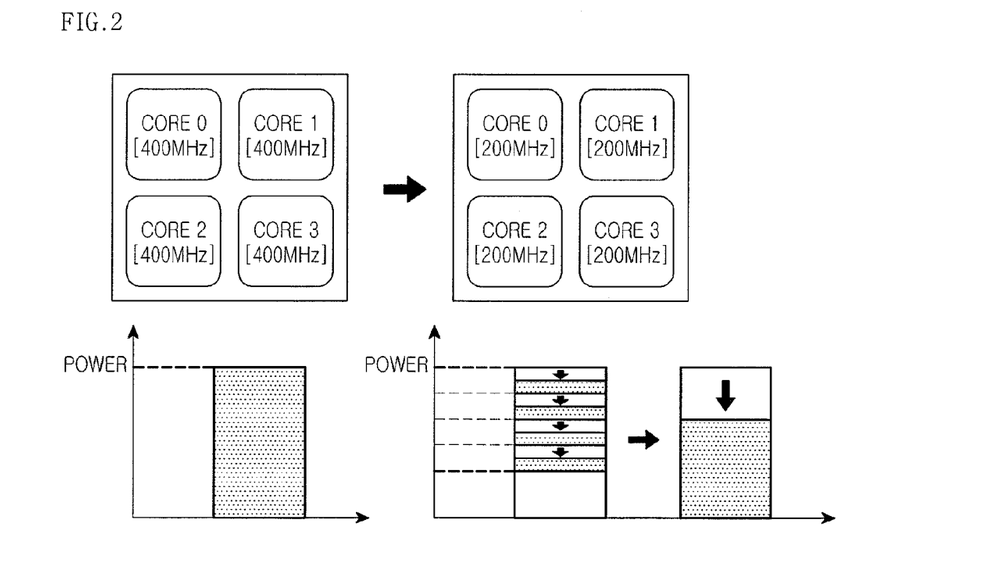
FIG. 2 is a diagram illustrating a general DVFS-based power management method.
Figure 3:
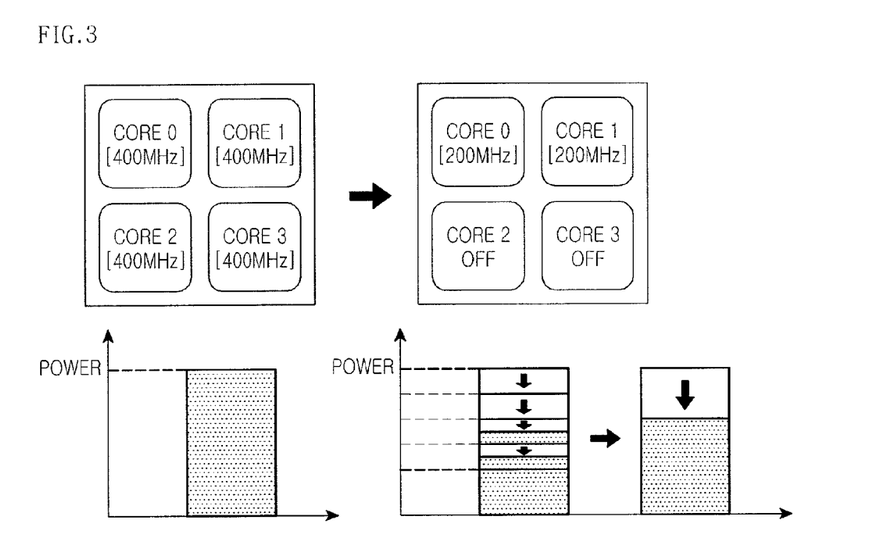
FIG. 3 is a diagram illustrating a general DPM-based power management method.

FIG. 1 illustrates a DPS-based power management method, FIG. 2 illustrates a DVFS-based power management method, and FIG. 3 illustrates a DPM-based power management method.

As illustrated in FIG. 1, DPS prevents an unnecessary waste of power by adjusting the number of cores to be turned on, according to the amount of computation. As illustrated in FIG. 2, DVFS reduces the total power consumption of a system by lowering frequencies of cores on the whole. As illustrated in FIG. 3, DPM may maximize low-power control by adjusting both on/off of cores and frequencies of cores according to the amount of computation.

Figure 4:
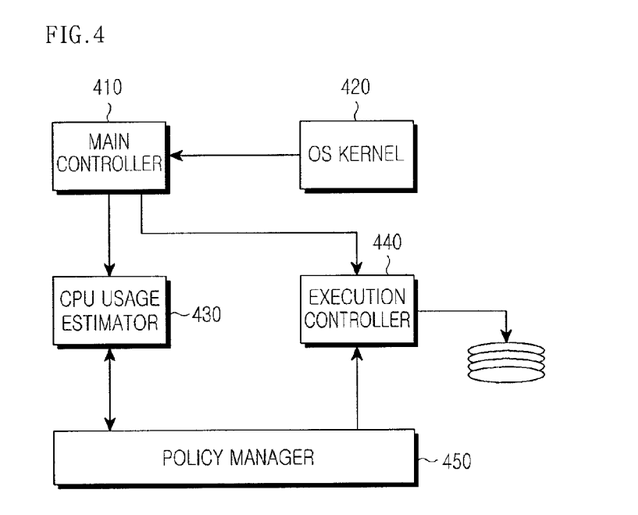
FIG. 4 is a block diagram of a general low-power control apparatus for DPM.

FIG. 4 is a block diagram of a low-power control apparatus for DPM.

As illustrated in FIG. 4, the low-power control apparatus for DPM includes a main controller 410, an Operation System (OS) kernel 420, a CPU usage estimator 430, an execution controller 440, and a policy manager 450.

The main controller 410 controls the CPU usage estimator 430 and the execution controller 440 depending on task status information received from the OS kernel 420. The CPU usage estimator 430 estimates a future CPU usage by monitoring information about a CPU usage during execution of tasks. The policy manager 450 exchanges information about policy control with the CPU usage estimator 430 and establishes a policy for controlling cores. The execution controller 440 directly controls cores according to the information received from the policy manager 450, thereby enabling low-power execution.

Advantageously, this multi-core low-power technique based on the CPU usages may directly check the status of the CPU and control power depending thereon. However, this technique has limits in accurately estimating a change in CPU usage that varies according to applications, and in case of significant error, may degrade performance of the system due to unnecessary core control. Besides, for an application, a change in CPU usage of which is significant, even though the change is accurately estimated, the core control speed may not keep up with the pace of the change in CPU usage, causing possible performance degradation of the system. Furthermore, as cores are frequently controlled depending on the usage change, system overhead may occur unexpectedly, increasing power consumption.

Figure 5:
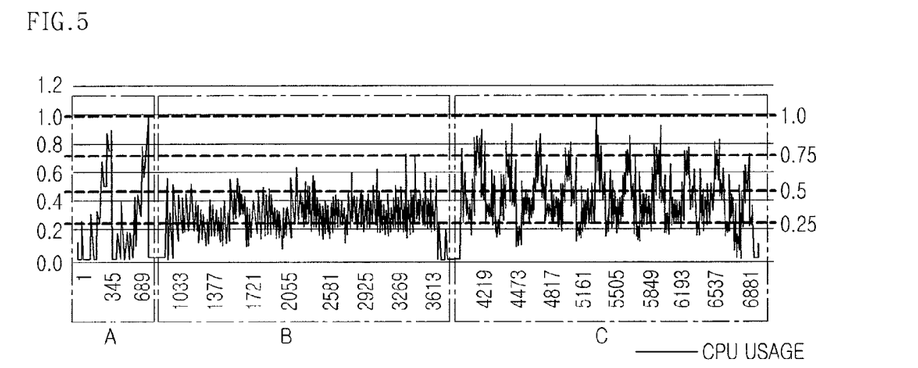
FIG. 5 is a diagram illustrating a change in CPU usage when a multi-core CPU with 4 ARM11 cores operates on Linux.

FIG. 5 illustrates a change in CPU usage when a multi-core CPU with 4 ARM11 cores operates on Linux.

In FIG. 5, Scenario A represents a case where an arbitrary application such as a game is run and closed, Scenario B represents a case where a video file is played by a multimedia player, and Scenario C represents a case where an arbitrary application is run and closed, and at the same time, a video file is played by a multimedia player. A CPU usage 1.0 means that the CPU is used 100%. Therefore, it is possible to perform low-power control without performance degradation of the scenarios by enabling one core between 0~0.25 of the CPU usage, two cores between 0.25~0.5, three cores between 0.5~0.75, and four cores between 0.75~1.00. In FIG. 5, margins at the boundaries are unconsidered.

DISCLOSURE OF INVENTION

Technical Problem

In Scenario A, because the CPU usage gradually increases, low-power control may be achieved by turning on one core and then additionally turning on cores one by one according to the change in CPU usage. However, in Scenarios B and C, performance degradation of the system may occur not only because the change in CPU usage is significant, but also because in a period where the CPU usage is instantaneously changed, the core control speed may not keep up with the pace of the change in CPU usage even though on/off of the cores is controlled according to the change in CPU usage. Moreover, if the on/off control of the cores is frequently performed, the system overhead increases, leading to power loss. Therefore, the method of performing DPM by monitoring only the CPU usage is inappropriate for the applications, whose CPU usages are subject to a significant change.

Solution to Problem

An aspect of the present invention is to address at least the above-mentioned problems and/or disadvantages and to provide at least the advantages described below. Accordingly, an aspect of exemplary embodiments of the present invention is to provide a method and apparatus for controlling power using information provided by a low-power multi-core system.

Another aspect of exemplary embodiments of the present invention is to provide a method and apparatus for controlling power using memory information provided by a low-power multi-core system as well as a CPU usage.

In accordance with one aspect of the present invention, an apparatus is provided for controlling power in a low-power multi-core system. The apparatus includes a main controller for receiving task information from an Operation System (OS) kernel upon start or end of a task, and processing the received task information; a task information controller for receiving task information needed for establishment of a power control policy from the main controller, estimating a future Central Processing Unit (CPU) usage using a current CPU usage in the task information, and monitoring memory-related information in the task information; a policy manager for establishing a policy for power control based on the estimated CPU usage and the monitored memory-related information, received from the task information controller; and an execution controller for controlling on/off of multiple cores according to the policy received from the policy manager.

In accordance with another aspect of the present invention, a method is provided for controlling power in a low-power multi-core system. The method includes receiving task information from an Operation System (OS) kernel upon start and end of a task; estimating a future CPU usage using a current CPU usage in the task information, monitoring memory-related information in the task information, and comparing a change in the current CPU usage with the monitored memory-related information; establishing a policy for power control based on the estimated CPU usage and the monitored memory-related information; and controlling on/off of multiple cores according to the established policy.

Advantageous Effects of Invention

As is apparent from the description, by controlling power using memory allocation information and thread information in addition to the CPU usage, the present invention may solve the problems caused by performing DPM using only the CPU usage.

In addition, for DPM execution, memory-related information and thread information are used in addition to the CPU usage in a period where the CPU usage is subject to a sudden change, thereby preventing performance degradation of the system and reducing power consumption for core switching.

BRIEF DESCRIPTION OF DRAWINGS

The above and other aspects, features and advantages of certain exemplary embodiments of the present invention will be more apparent from the following description taken in conjunction with the accompanying drawings, in which.

MODE FOR THE INVENTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention uses memory-related information and thread information in addition to the CPU usage in order to prevent the problems which may occur because of performing power control considering only the CPU usage in a period where the CPU usage undergoes a sudden change.

Figure 6:
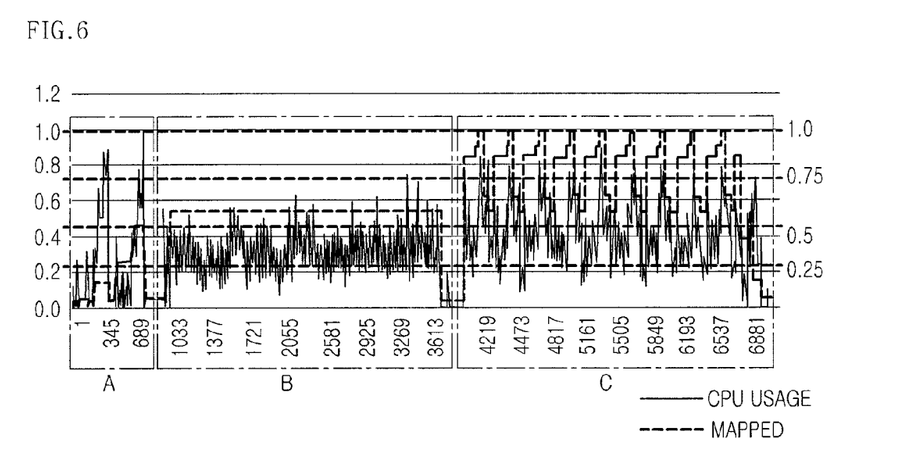
FIG. 6 is a diagram illustrating a change in CPU usage and mapped information (memory information) in the same scenario as that of FIG. 5.

FIG. 6 illustrates a change in CPU usage and mapped information (memory information) in the same scenario as that of FIG. 5.

The mapped information means a size of a memory allocated for memory mapping. That is, the mapped information is the amount of allocated memory, required to use map devices, files, libraries, etc., and based on a change in this value, it is possible to determine the current status of the system or information about the memory used by a running application(s).

Referring to FIG. 6, it is noted that a mapped value is maintained constant in Scenario B. Therefore, in Scenario B, by performing DPM based on the mapped value instead of the CPU usage, it is possible to prevent the performance degradation problem caused by performing DPM according to the fast-changing CPU usage, or the power reduction problem caused by frequent on/off switching of cores. In this case, since the CPU usage ranges from 0.4 and 0.6, three cores are continuously turned on to be enabled.

However, it can be appreciated that even in FIG. 6, the mapped value in Scenario C is subject to a significant change without being maintained constant. In Scenario C, because even the mapped value-based DPM is inefficient, it is necessary to consider other information in addition to the CPU usage and the mapped information during DPM execution.

Figure 7:
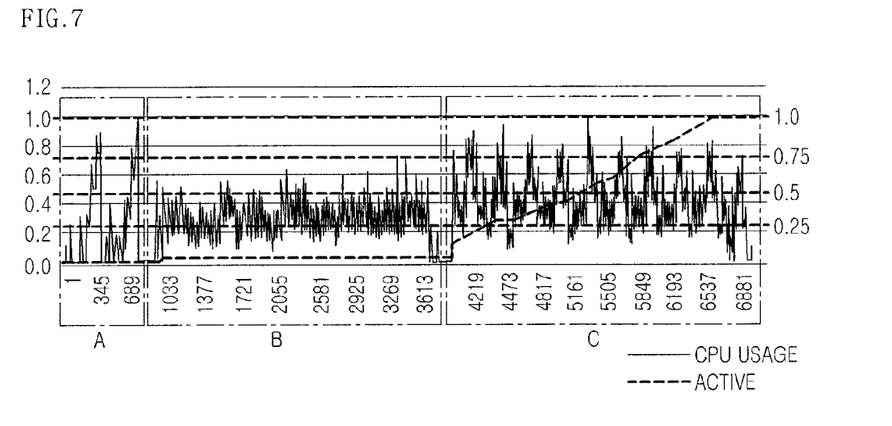
FIG. 7 is a diagram illustrating a change in CPU usage and active information (memory information) in the same scenario as that of FIGS. 5 and 6.

FIG. 7 illustrates a change in CPU usage and active information (memory information) in the same scenario as that of FIGS. 5 and 6.

The active information means a size of a buffer or a cache memory now in use. In Scenario C of FIG. 7, it is noted that the active value continues to increase, which indicates an increase in usage of the buffer and the cache memory. Therefore, in Scenario C, a policy of interrupting DPM upon an increase in the active value may be used in order to prevent the performance degradation problem which may occur due to the rapid change in CPU usage, or the power reduction problem caused by the frequency on/off switching of cores during DPM execution.

Figure 8:
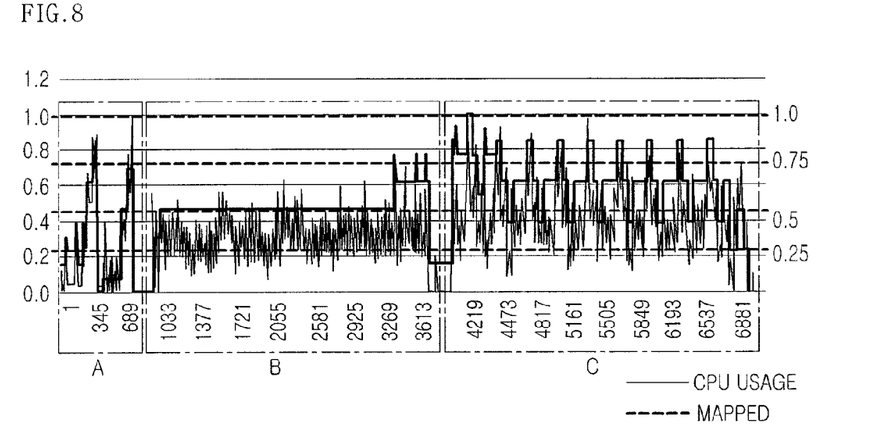
FIG. 8 is a diagram illustrating a change in CPU usage and thread information (nr_threads) in the same scenario as that of FIGS. 5 to 7.

FIG. 8 illustrates a change in CPU usage and thread information (nr_threads) in the same scenario as that of FIGS. 5 to 7.

The nr_threads information is information about the number of threads presently created in the system, and based on this information, it is possible to determine creation and destruction of threads. It is noted in FIG. 8 that the similar change to the change in mapped information in FIG. 6 occurs in Scenario B, and this is because the threads are created at the beginning of Scenario B and abruptly destructed at the end of Scenario B. Therefore, in Scenario B, by performing DPM based on the nr_threads value instead of the CPU usage, it is possible to prevent the performance degradation problem caused by the fast-varying CPU usage, or the power reduction problem caused by the frequency on/off switching of cores.

Next, a description will be made of an apparatus for performing DPM according to an embodiment of the present invention.

Figure 9:
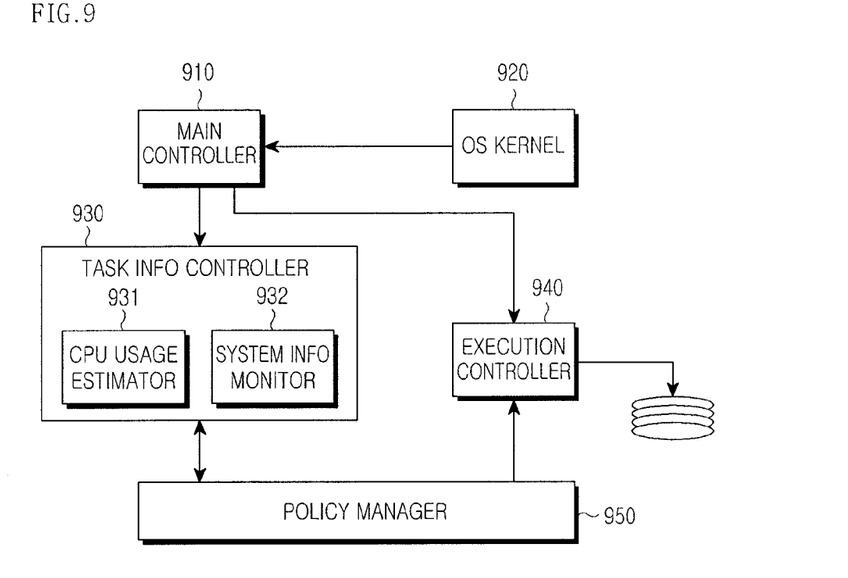
FIG. 9 is a diagram illustrating a structure of a DPM apparatus according to an embodiment of the present invention.

FIG. 9 illustrates a structure of a DPM apparatus according to an embodiment of the present invention. In an embodiment of the present invention, a system information monitor 932 is added to the general DPM apparatus illustrated in FIG. 4.

A main controller 910 receives task status information and a task id from an OS kernel 920 and handles the associated task, during start or end of the task.

A task information controller 930 includes a CPU usage estimator 931 and the system information monitor 932, and receives task information needed for policy establishment from the main controller 910.

The CPU usage estimator 931 receives information about a CPU usage from the main controller 910 and estimates a future CPU usage, during execution of the task. The system information monitor 932 monitors the thread and memory-related information in the task information, and compares them with a change in CPU usage. In the present invention, as the memory-related information, the system information monitor 932 monitors a change in mapped information for memory mapping, and a change in active information indicating a size of a buffer and a page cache memory and the number nr_threads of threads generated.

A policy manager 950 establishes a policy for optimal DPM based on the information obtained from the CPU usage estimator 931 and the system information monitor 932, and provides an execution controller 940 with information about the established policy to control cores according to the established policy.

The execution controller 940 performs low-power control by controlling the cores according to the information received from the policy manager 950.

Now, an operation of the DPM apparatus will be described in conjunction with the accompanying drawings.

Figure 10:
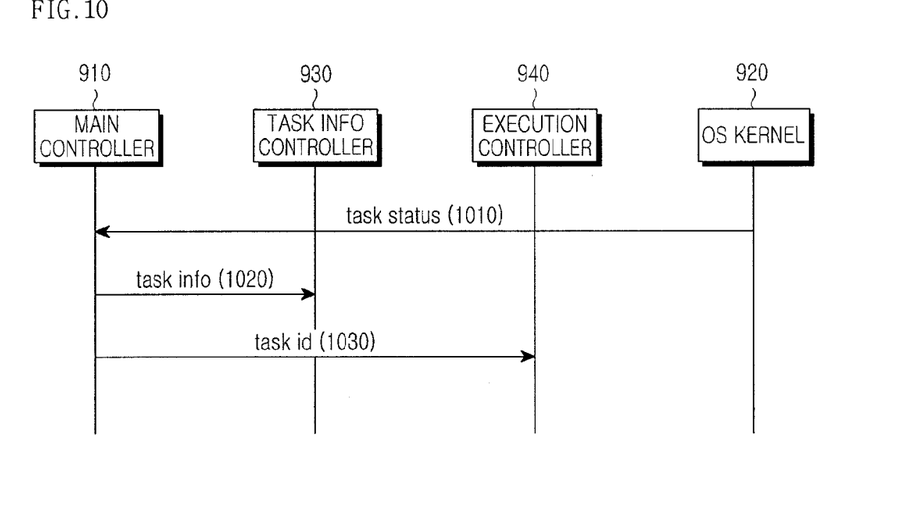
FIG. 10 is a diagram illustrating an operation of a main controller of a DPM apparatus according to an embodiment of the present invention.

FIG. 10 illustrates an operation of the main controller 910.

As illustrated in FIG. 10, the main controller 910 is called by the OS kernel 920 at the beginning or end of a task. At this point, the main controller 910 receives task status information including a task id from the OS kernel 920 (Step 1010). The main controller 910 operates the task information controller 930 by determining a task-changed point and delivering task information thereto (Step 1020), and upon termination of the operation of the task information controller 930, operates the execution controller 940 by delivering the task id thereto (Step 1030).

Figure 11:
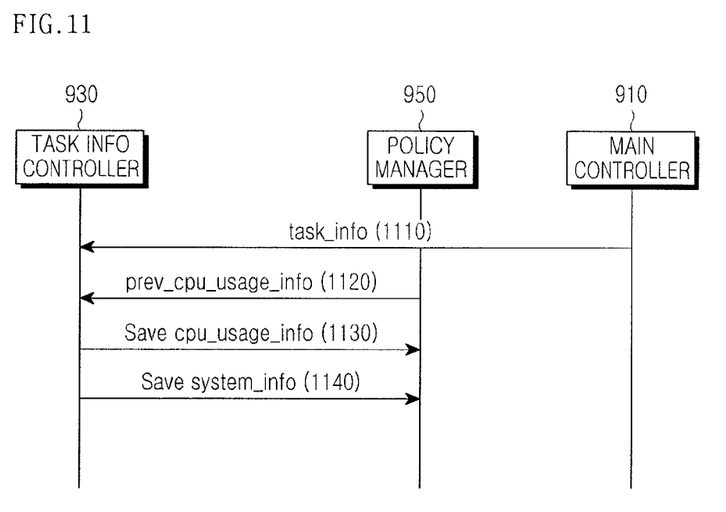
FIG. 11 is a diagram illustrating an operation of a task information controller of a DPM apparatus according to an embodiment of the present invention.

FIG. 11 illustrates an operation of the task information controller 930.

As illustrated in FIG. 11, the task information controller 930 is called by the main controller 910 at a task-changed point. At this time, the task information controller 930 receives CPU usage and memory-related information about the task (Step 1110). Thereafter, the CPU usage estimator 931 in the task information controller 930 gets a previous CPU usage from the policy manager 950 (Step 1120). The CPU usage estimator 931 estimates a future CPU usage from the previous CPU usage and stores the estimate in the policy manager 950 (Step 1130). In addition, the system information monitor 932 in the task information controller 930 monitors memory information varying during task execution and delivers the monitored value to the policy manager 950 (Step 1140).

Figure 12:
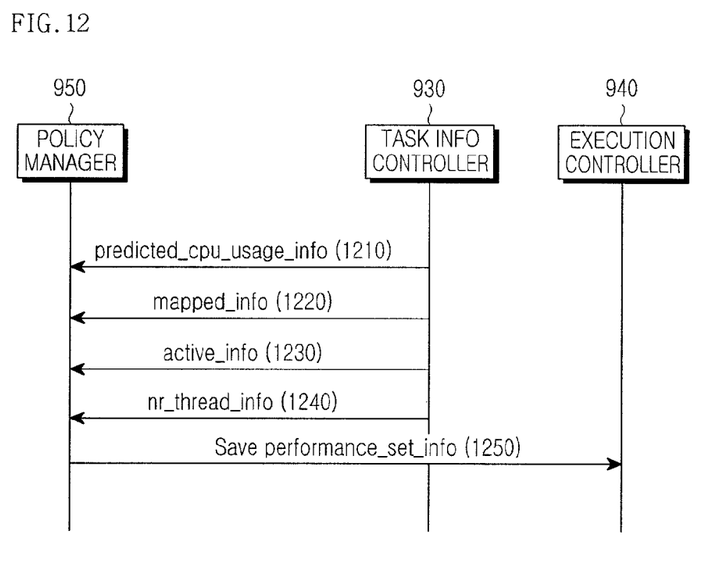
FIG. 12 is a diagram illustrating an operation of a policy manager in a DPM apparatus according to an embodiment of the present invention.

FIG. 12 illustrates an operation of the policy manager 950.

As illustrated in FIG. 12, the policy manager 950 receives the CPU usage value estimated by the CPU usage estimator 931 in the task information controller 930 (Step 1210). In addition, the policy manager 950 selects a CPU usage threshold for DPM, determines whether to perform DPM, and a DPM level by comparing the CPU usage with the CPU usage threshold, and provides the determined information to the execution controller 940 (Step 1250).

In addition, the policy manager 950 receives mapped, active and nr_threads values (memory information) from the system information monitor 932 in the task information controller 930 (Steps 1220, 1230 and 1240). The policy manager 950 compares previous values of the mapped, active and nr_threads with their current values in a period where DPM execution is frequently switched on/off due to the significant change in CPU usage. If the mapped and nr_threads are maintained constant, the policy manager 950 stops the DPM execution and provides the execution controller 940 with execution information performance_set_info to maintain the core status level satisfied by the system (Step 1250). If a difference between previous and current values of the active is greater than 0 for a predetermined time, the policy manager 950 provides the execution controller 940 with execution information performance_set_info to stop DPM execution (Step 1250).

Figure 13:
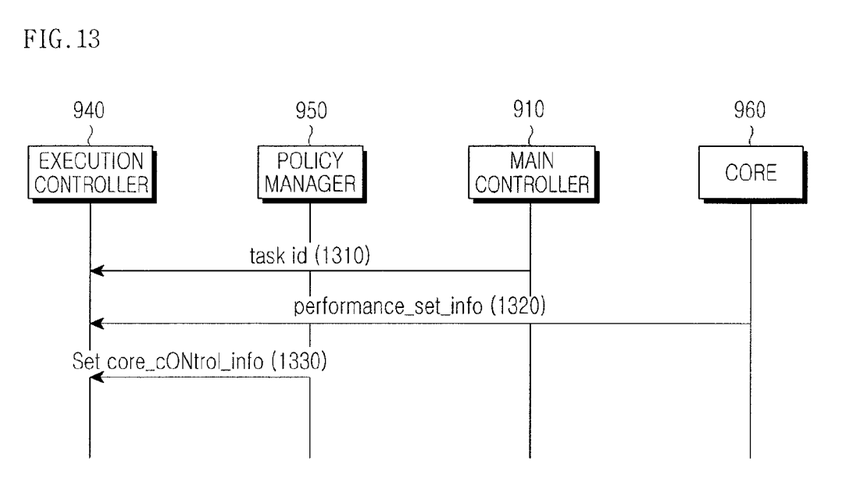
FIG. 13 is a diagram illustrating an operation of a DPM apparatus according to an embodiment of the present invention.

FIG. 13 illustrates an operation of the execution controller 940.

As illustrated in FIG. 13, the execution controller 940 is called by the main controller 910 at a task-changed point, and at this time, receives a task id (Step 1310). In addition, the execution controller 940 receives execution information performance_set_info from cores 960 (Step 1320) and core control information core_control_info from the policy manager (Step 1330), and controls the cores 960 according to the received information.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. An apparatus for controlling power in a multi-core system, the apparatus comprising:
   a controller configured to;
   process task information,
   estimate a central processing unit (CPU) usage based on the task information,
   monitor memory-related information based on the task information, and
   control an activation of multiple cores based on a policy; and
   a policy manager configured to:
   establish the policy for power control based on a comparison result between a change in the CPU usage and a predetermined threshold, and
   store values for at least one parameter included in the memory-related information received from the controller,
   wherein, if the comparison result indicates that the change in the CPU usage exceeds the predetermined threshold, the policy manager is further configured to compare a previous value stored before a time that the change exceeds the predetermined threshold and a current value stored at the time for at least one parameter included in the memory-related information, and
   wherein, if a difference between the previous value and the current value is greater than a difference threshold during a predetermined time, the policy manager is further configured to establish a policy of stopping control of the multiple cores.

2. The apparatus of claim 1, wherein the controller is further configured to:
   estimate future CPU usage; and
   monitor the memory-related information.

3. The apparatus of claim 2, wherein the controller is further configured to compare a change in a current CPU usage with the monitored memory-related information, and to deliver the comparison result to the policy manager.

4. The apparatus of claim 1, wherein the memory-related information comprises at least one of a size allocated for a memory estimating a usage of a memory, active information representing a size of a buffer and a page cache memory, and a number of threads generated in the multi-core system.

5. A method for controlling power in a low-power multi-core system, the method comprising:
   estimating a central processing unit (CPU) usage based on task information;
   monitoring memory-related information based on the task information;
   comparing a change in the current CPU usage with the monitored memory-related information;
   storing values for at least one parameter included in the memory-related information;
   establishing a policy for power control based on a comparison result between a change in the CPU usage and a predetermined threshold; and
   controlling an activation of multiple cores according to the policy,
   wherein, if the comparison result indicates that the change in the CPU usage exceeds the predetermined threshold, the method further comprises comparing the previous value stored before a time that the change exceeds the predetermined threshold and a current value stored at the time for at least one parameter included in the memory-related information, and
   wherein, if a difference between the previous value and the current value is greater than a difference threshold during a predetermined time, the method further comprises establishing a policy of stopping control of the multiple cores.

6. The method of claim 5, wherein the memory-related information comprises at least one of a size allocated for a memory estimating a usage of the memory, active information representing a size of a buffer and a page cache memory, and a number of threads.

* * * * *